Figure 1:
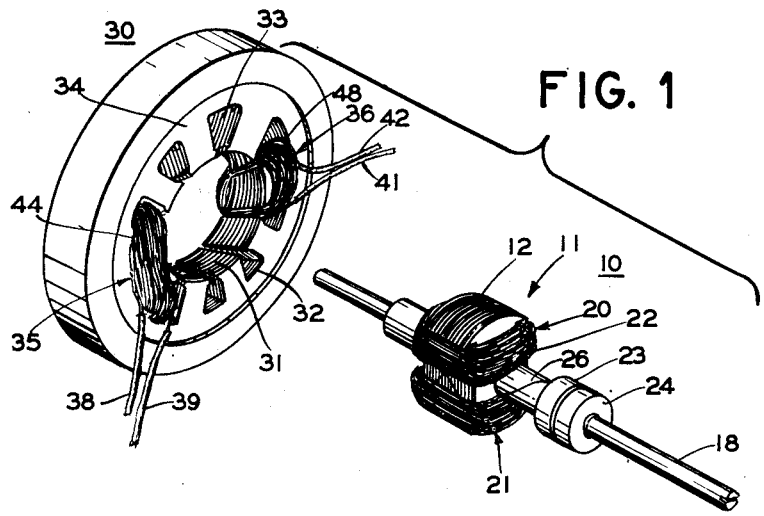

Aug. 12, 1952 — A. M. MacCALLUM — 2,606,944
CONTROL SIGNAL GENERATOR
Filed Aug. 17, 1948

INVENTOR.
ALAN M. MAC CALLUM
BY Robert Levine
his ATTORNEY

Patented Aug. 12, 1952

2,606,944

UNITED STATES PATENT OFFICE 2,606,944

CONTROL SIGNAL GENERATOR

Alan M. MacCallum, Plainfield, N. J., assignor to Bendix Aviation Corporation, Teterboro, N. J., a corporation of Delaware Application August 17, 1948, Serial No. 44,759

9 Claims. (Cl. 171—119)

This invention relates generally to electromagnetic generators and has specific application to apparatus and methods for generating voltages having non-linear characteristics.

In automatic control systems such, for example, as automatic pilot systems, it may be desired that control signals be generated which have voltage characteristics providing substantially insensitive or zero outputs about a predetermined neutral or zero position but which will vary thereabout, as required, in a substantially non-linear fashion to provide a predetermined angular control of a utilizer, for example an automatic pilot.

Various expedients have been tried for fulfilling the above control signal requirements. For example, such control signals may be derived mechanically as by providing a system of cams cut to trace a desired voltage pattern or electrically as by controlling an increasing voltage output delivered to a follow-up system using a rotatable potentiometer included in a secondary voltage circuit. But, such means are relatively expensive and complicated since various and multiple components are required to accomplish a desired voltage output pattern.

The present invention, as hereinafter described, discloses an inductor type signal generator which defines an output having a non-linear voltage characteristic which provides a substantially insensitive or zero output at a predetermined zero position but which will vary non-linearly about this neutral position. This output as plotted in volts per degrees of angular rotation will produce a voltage displacement curve substantially resembling a hyperbola. The hyperbolic, non-linear response derived from the generator enables the angular control of suitable utilizing mechanism. Thus, a simple, efficient and substantially continuous controller may be afforded giving a voltage control requisite for certain types of guidance apparatus, etc.

It is, therefore, one of the objects of the present invention to provide a voltage generator having non-linear output characteristics.

Still another object of the present invention is to provide in a control system means for generating a voltage control signal having a flat portion.

Still another object of the present invention is to provide a voltage generator having an output characteristic which gives a substantially flat response at a predetermined neutral or zero position but provides a substantially non-linear voltage characteristic at points displaced from said zero position.

Yet another object of the present invention is to provide a novel electromagnetic energy generator utilizing a rotatable core means and a stationary core means, said stationary core means being wound in such fashion to give a voltage output having non-linear characteristics.

Still another object of the present invention is to provide a novel arrangement of stator coils in an inductor type signal generator for producing a voltage-displacement curve resembling a hyperbola.

Another object of the present invention is to provide a signal generator producing a control voltage having a non-linear characteristic which may be utilized to control apparatus needing a non-linear input.

Another object of the present invention is to provide an electrical control signal having a characteristic such that it provides a flat control at a predetermined position and a non-linear control at all substantial points displaced therefrom.

Still another object of the present invention is to provide in an automatic pilot controller means for initiating a turn which is relatively insensitive about a neutral position but increases its response non-linearly as the angle through which it travels increases.

Still another object of the present invention is to provide means, apparatus and instrumentalities adapted for attaining the foregoing objects whether such uses or means have been particularly referred to or not.

Referring to the drawings in which similar reference numerals refer to like parts, Figure 1 is an exploded pictorial view of an embodiment of the present invention useful in showing the novel construction of the control signal generator which gives a non-linear voltage output.

Figure 3:
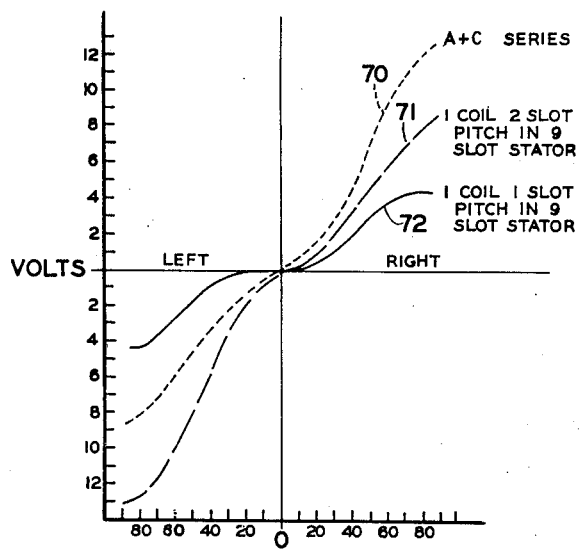
Figure 2:
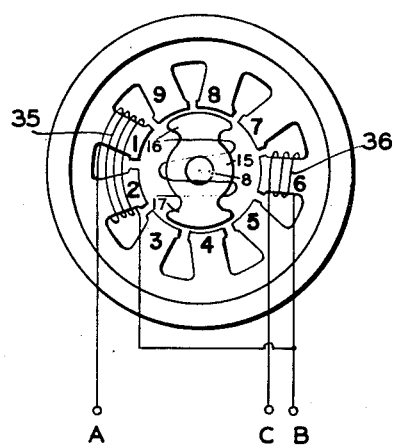

Figure 2 is a schematic representation of the wiring arrangement of the embodiment of the generator as shown in Figure 1, and Figure 3 illustrates graph representations showing the relation of induced voltage output from the aforesaid generator as compared with angular displacement in degrees of the generator rotor.

Generally speaking, the present invention describes a signal generator adapted for use with control apparatus and comprises a rotor adapted to be excited from a single phase alternating current source of energy at a predetermined cycle frequency. The rotor includes a plurality of wire wound coils connected in series, and is suitably mounted for rotation within a circumscribing stator. The stator comprises a plurality of conjoined laminations which are slotted at a predetermined pitch to form a plurality of stator poles.

A wire coil, or coils, may be wound about a predetermined number of stator poles and are so positioned that upon rotation of said rotor within said stator an induced output voltage having a non-linear characteristic may be taken from said stator corresponding to the angle of displacement of the rotor within the stator.

Now referring to Figures 1 and 2 of the drawing, 10 represents a rotor comprising a shaft 18 upon which is mounted a core 11 which is preferably composed of a plurality of individually conjoined laminations 12. The individually conjoined laminations 12 take on the configuration or shape of a "dumb-bell" having an annular mid-section 15 and end extension sections 16 and 17. This type of construction of the rotor is known to those skilled in the art as a salient pole type rotor.

Within pole extensions 16 and 17, and about mid-section 15, a plurality of wire coils 20 and 21 including a multiplicity of enamel insulated wires 22 are wound in series and are connected to slip rings 23 and 24 as by means of suitable conductors 26. Slip rings 23 and 24 have fed thereto single phase alternating current energy at a predetermined cycle frequency, for example, 400 cycles per second, for exciting rotor 10, and more specifically coils 21 and 22, with alternating current energy for creating the necessary magnetic field which may be used, as hereinafter described, for inducing a voltage in stator 30.

Stator 30 comprises a plurality of laminations 31 superimposed on each other, or conjoined, to form a substantially compact metallic structure having a low hysteresis characteristic. Laminations 31 have a series of slots 32 and 33 cut therethrough at a predetermined skew or pitch. By means of slots 32, 33, etc. a plurality of individual poles, such as 34, are formed. In the stator, as shown in Fig. 2, nine such poles, numbered 1–9 are constructed. The formation of an odd number of poles, however, is not to be taken in a limiting sense since stators have been constructed utilizing an even number of poles.

About one or more of said stator poles, such as poles 1, 2 and 6 of Fig. 2, a plurality of separate coils of wire 35, 36 may be wound. As shown in Figs. 1 and 2 stator coil 35 is wound about poles 1 and 2, and comprises a plurality of copper wire turns 44 connected to output leads 38 and 39 which go to end output terminals "A" and "B." Similarly, stator coil 36 comprising a plurality of copper wire turns 48 is separately wound about pole 6 and is connected to output terminals "B" and "C" by means of lead wires 41, 42. Stator coils 35, 36, therefore, span different equi-distant arcs with respect to the axis of rotation of the rotor.

Stator coils 35 and 36 are shown as being diametrically opposed to each other and as being separated by a plurality of poles. Moreover, since stator coil 35 is wound about two poles of the stator it may suitably be defined as having a two slot pitch, while coil 36, being wound about only one stator pole may be defined as having a one slot pitch.

When rotor 10 is assembled and suitably mounted within stator 30, angular movement of rotor 10, including coils 20 and 21 which are excited from a single phase A. C. source at a given cycle frequency; e. g. 400 cycles per second, within stator 30 will cause a voltage to be induced within coils 35 and/or 36 in a magnitude dependent upon the angular relationship of excited rotor 10 with respect to coils 35 and 36. That is, if rotor 10 is so disposed within stator 30 that the magnetic lines of force generated by coils 20 and 21 do not cut the plurality of wire turns 44, 48 comprising stator coils 35 and 36 there will be no induced voltage output present.

In automatic control systems it may be desired that a voltage be generated which has a non-linear characteristic so that at a predetermined null point a substantially insensitive or zero output is obtainable from coils 35, 36. On movement of the rotor 10 about said null point, however, an induced voltage output utilizable for control purposes may be obtained which when plotted as volts per degrees of angular rotation of the rotor will give a substantially hyperbolic curve. By constructing coils 35 and 36 as shown in Figures 1 and 2, voltage outputs may be obtained which will substantially fulfill the aforesaid unique requirements.

In Figure 3, curve 70 represents the induced voltage output obtainable from the stator as taken across output terminals "A" and "C". Curve 70 represents the additive effect of the voltage induced in stator coils 35 and 36, to give a voltage characteristic curve having a non-linear response. By constructing coils 35 and 36 in the manner shown, a zero output at a predetermined zero position may be obtained but which gives an increasing non-linear voltage output as angular displacement of the rotor 10 within stator 30 takes place.

Curve 71 illustrates the voltage output obtained at terminals "A" and "B" by the induced voltage derived through the sole utilization of stator coil 35 and rotor 10. It is thus seen that curve 71, which represents an induced output as taken from a two slot pitch wound stator coil 35, has a characteristic voltage output substantially more linear than that shown by curve 70. Again, curve 72 represents the induced voltage output as taken across terminals B and C from coil 36, which is a one slot pitch type of stator coil. Curve 72, thus, defines a voltage characteristic of an entirely different nature from curves 70 and 71. Thus, voltage outputs may be obtained having non-linear characteristics which are utilizable for the control of various instruments.

Further, the remaining structure of the stator which is not used in the formation of stator poles may be constructed in integral and non-slotted fashion. Moreover, as has been shown, one or more coils may be used in the stator, either individually or in combination, to obtain any desired voltage output having non-linear characteristics.

Since various changes and modifications to the forms and relative arrangement of the parts described herein may appear to those skilled in the art, it is not intended that the scope of the invention be restricted to the recitations made herein, but rather is to be obtained from a reading of the specification in conjunction with the here appended claims.

I claim:

1. A signal generator for control apparatus, comprising a rotor adapted to be excited from a single phase A. C. source of predetermined frequency, said rotor including a plurality of wire coils connected in series, a stator including a plurality of laminations, a plurality of slots having a predetermined pitch cut through said stator, a plurality of stator pole elements formed from said slots cut through said laminations, and a plurality of diametrically positioned wire coils wound about said stator pole elements, one of said coils being wound about only one of said pole elements, another coil being wound about at least two of said remaining pole elements, whereby a voltage induced in said stator upon rotation of said rotor may be obtained, said output voltage having non-linear characteristics.

2. A signal generator adapted to be excited from an A. C. source of predetermined frequency comprising rotor means and stator means, slots cut in said rotor means and stator means, primary exciting windings positioned in the slots of one of said means for connection with said A. C. source to produce flux linking said stator and rotor means, interconnected separate diametrically opposed windings having unequal coupling areas with the primary windings and positioned on the other of said means and arranged in said slots so that the flux generated by said primary windings links one of said separate windings prior to and subsequent to linking the other of said separate windings upon rotation of said rotor means.

3. A variable signal transformer comprising two relatively movable parts, at least two windings on one of said parts and a single winding on the other of said parts adapted for inductive coupling with said first-named windings, said first-named windings being diametrically opposed and having unequal coupling areas with said single winding and being arranged on said one part so that in response to relative motion of said parts said single winding becomes inductively coupled with one of said first-named windings prior to inductive coupling with the other of said first-named windings.

4. A signal generator comprising a wire wound rotor adapted to be excited from an A. C. source and a stator having mounted thereon a plurality of windings for inductive coupling with the rotor winding upon rotation of said rotor, two of said stator windings being positioned diametrically opposite each other and spanning different equidistant arcs with respect to the axis of rotation of said rotor.

5. A signal generator comprising a wire wound rotor adapted to be excited from an A. C. source and a stator having mounted thereon a plurality of windings for inductive coupling with the rotor winding upon rotation of said rotor, two of said stator windings being diametrically opposed and circumscribing pole elements whose pole faces extend over varying degrees of arc with respect to the axis of rotation of said rotor.

6. A signal generator comprising a stator member and a rotor member, one of said members being provided with at least two windings and the other of said members being provided with at least one winding adapted to be excited from a source of A. C. current to induce a signal in the windings of said one member upon relative movement of said members, two of the windings of said one member being diametrically opposed and having unequal coupling areas with the exciting winding and being connected in series to provide output connections whereby the relation between the amplitude of a signal voltage output across said output connections and the displacement between said members is in the nature of a hyperbolic function.

7. A signal generator comprising a stator member and a rotor member, one of said members being provided with at least two windings and the other of said members being provided with at least one winding adapted to be excited from a source of A. C. current to induce a signal in the windings of said one member upon relative movement of said members, two of the windings of said one member being diametrically opposed and being of unequal size thus providing unequal coupling zones with the exciting winding and being connected in series to provide output connections whereby the relation between the amplitude of a signal voltage output across said output connections and the displacement between said members is in the nature of a hyperbolic function.

8. A signal generator comprising a stator member and a rotor member in inductive relation with each other, one of said members including a winding adapted to be energized from an alternating current source, the other of said members having a plurality of slots cut therethrough to form a plurality of pole elements, and a plurality of windings separately circumscribing at least one of said pole elements with two of said windings being oppositely positioned, one of said oppositely positioned windings circumscribing at least one more pole element than the other, said oppositely positioned windings being connected in series to provide output connections whereby the relation between the amplitude of a signal voltage output of said generator and angular displacement of the rotor member is in the nature of a hyperbolic function.

9. A signal generator comprising a rotor member and a stator member rotatable relative to one another, a winding on one of said members and a plurality of windings on the other of said members for inductive coupling with the winding of said first-mentioned member, two of said last-mentioned windings being diametrically opposed and spanning different equi-distant arcs with respect to the axis of rotation of said rotor member.

ALAN M. MacCALLUM.

REFERENCES CITED

The following references are of record in the file of this patent:

UNITED STATES PATENTS

| Number | Name | Date |
|---|---|---|
| 1,633,780 | Fitzsimmons | June 28, 1927 |
| 1,964,265 | Markley | June 26, 1934 |
| 1,970,854 | Hobart | Aug. 21, 1934 |
| 2,087,636 | Baumann | July 20, 1937 |
| 2,404,209 | Bayles | July 16, 1946 |

FOREIGN PATENTS

| Number | Country | Date |
|---|---|---|
| 655,907 | France | Apr. 25, 1929 |